UNITED STATES PATENT OFFICE.

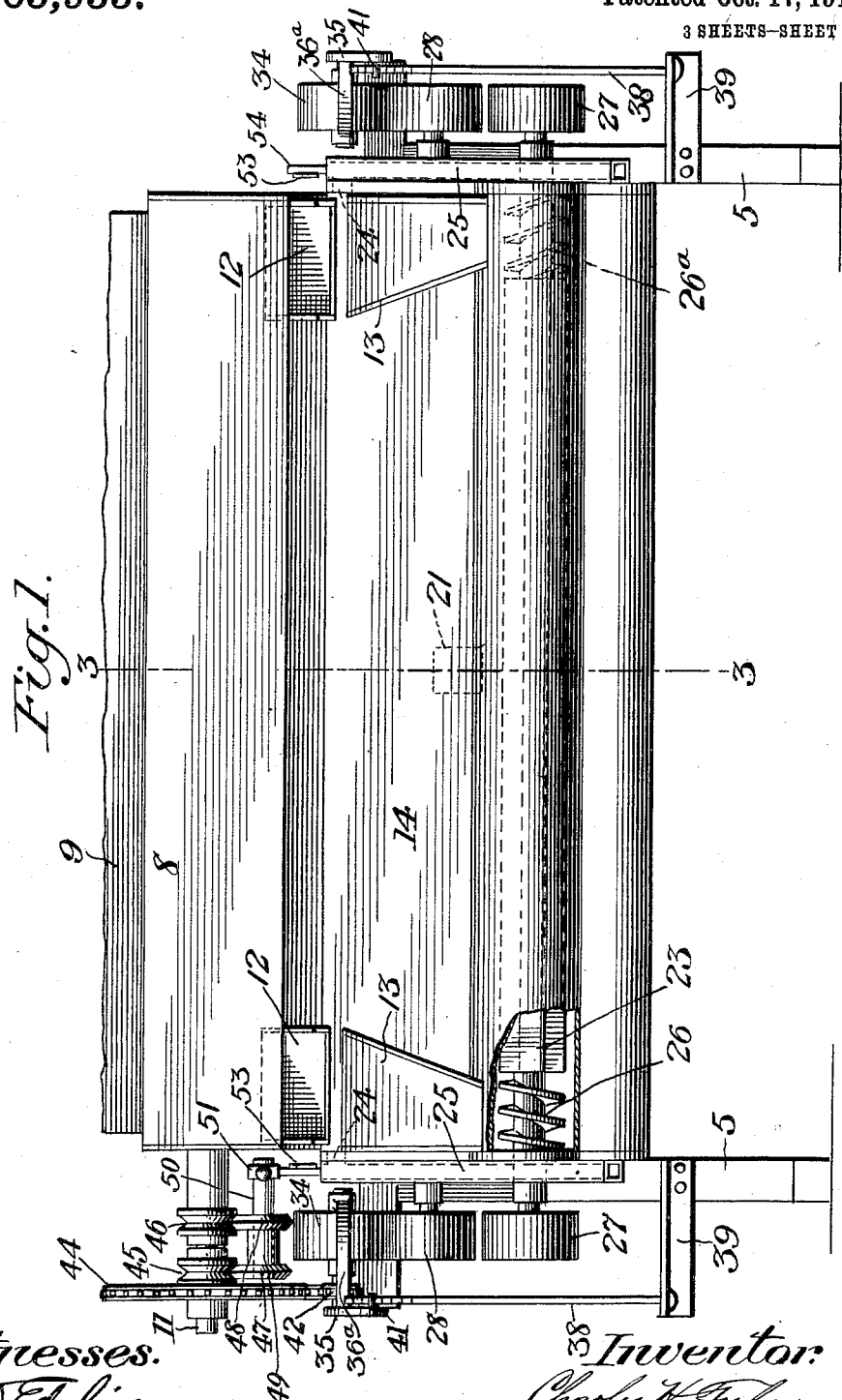

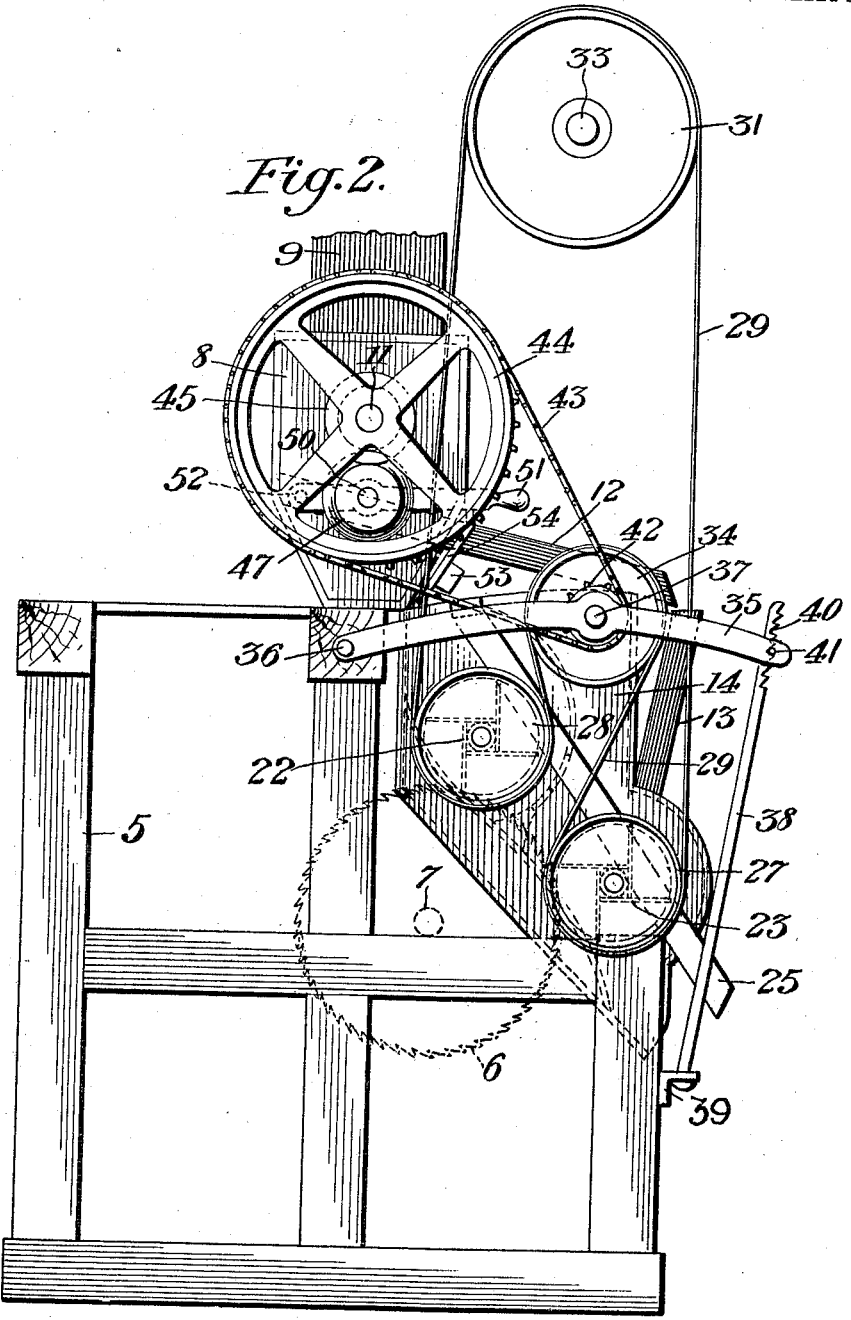

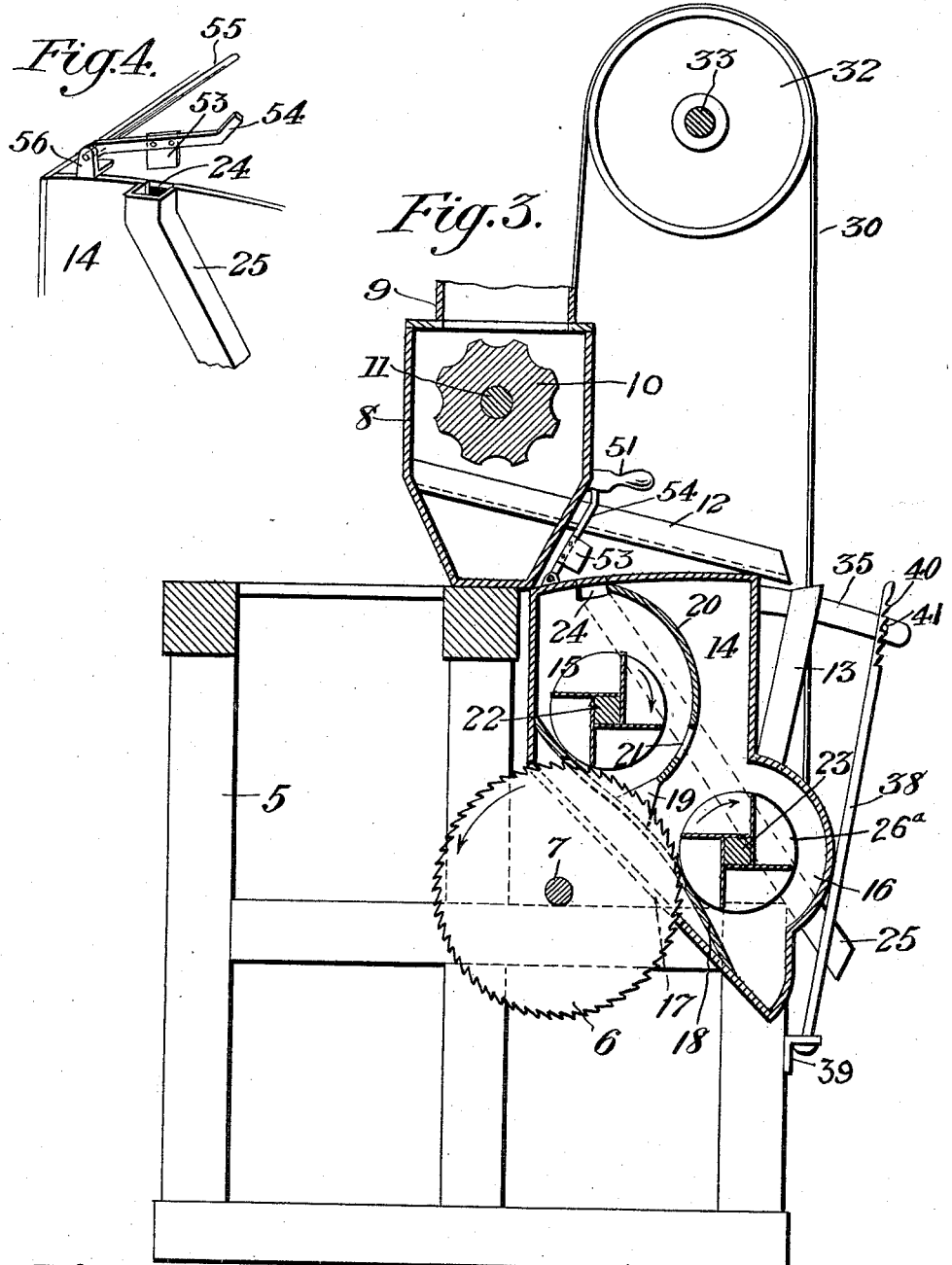

CHARLES HIRAM FULSON, OF WEST MONROE, LOUISIANA, ASSIGNOR OF ONE-HALF TO JOHN W. TODD, OF NEW ORLEANS, LOUISIANA.

COTTON-SEED LINTER.

1,005,955.     Specification of Letters Patent.     Patented Oct. 17, 1911.

Application filed June 9, 1910. Serial No. 566,010.

*To all whom it may concern:*

Be it known that I, CHARLES H. FULSON, a citizen of the United States, and resident of West Monroe, parish of Ouachita, State of Louisiana, have invented certain new and useful Improvements in Cotton-Seed Linters; and I do hereby declare the following to be a full, clear, and exact description of the invention, such as will enable others skilled in the art to which it appertains to make and use the same.

This invention relates to cotton seed linters, and more particularly to apparatus of this character in which a plurality of rolls of cotton seed are rotated in contact with the same linting or saw cylinder. In an application filed January 20, 1910, Serial No. 539,146, I have described a linter of this kind, wherein the bodies of seed may be rotated in contact with the linting cylinder by means of ordinary floats arranged at different points in the periphery of the cylinder, such floats being inclosed in separate chambers or cylinders through which the seed is passed in succession. The linter shown in the drawings of the application in question is designed to receive the seed to be treated in the upper float cylinder and to discharge it at one end of the lower float cylinder, though the invention is not limited to this specific operation.

The object of the present invention, in one of its aspects, is to provide a linter in which the seed takes a course through the machine different from that in the above mentioned machine, with a view to increasing the capacity of the linter by increasing the inlet and discharge area and the ease with which the body of seed passes through the machine.

From another aspect the invention seeks to provide a machine in which the discharge from each float chamber and from the machine as a whole keeps pace exactly with the feeding in of additional seed. This is accomplished by causing the seed to traverse the machine in the direction opposed to the force of gravity, the seed passing out of each float chamber by a sort of overflowing action, so that a full dense roll must be formed in each float chamber before the discharge from that chamber commences to take place. In this way, the seed is properly held against the saws in a dense compact mass, so that a proper linting action is absolutely necessitated, and if the feed is stopped for any reason the machine will continue to run with full rolls of seed and to do effective work on the material.

In the accompanying drawings: Figure 1 is a front elevation of a linter constructed in accordance with the invention, certain parts being omitted, Fig. 2 is an end elevation of the machine, Fig. 3 is a vertical transverse section of the machine on line 3—3 of Fig. 1, and Fig. 4 is a detail perspective view of one of the discharge spouts and its controlling gate.

Referring to the drawings, the end frames 5 of the machine may be of any suitable construction, and extending between them and suitably journaled therein is a linting cylinder 6 which preferably consists of a large number of closely grouped saws, as previously intimated, said saws being mounted on a shaft 7. It is to be understood that the mounting of the saw cylinder in the machine frame is not shown in detail because it forms no part of the invention, which concerns itself chiefly with the means for presenting the cotton seed to the saws and for discharging the seed from the machine after the lint has been removed therefrom. After the lint has been taken off from the seed by the saw teeth it is, of course, striped off from such saw teeth in any suitable way, but as this feature is likewise immaterial to the invention, I have not illustrated the means for removing the lint from the saw teeth.

On top of the frame is mounted a feed hopper or casing 8, into which the seed to be treated is discharged from the chute 9, and within the feed hopper rotates the usual feed roll 10, mounted on a shaft 11 extending out of said hopper at one end, as shown in Fig. 1. The feed roll 10 controls the discharge of the seed from the ends of the feed hopper 8, by way of discharge spouts 12, into upright spouts or hoppers 13 arranged at the front of the machine and delivering the seed into the ends of a linter casing 14 supported by and extending between the end frames 5. The linter casing is divided into an upper float chamber or cylinder 15 and a lower float chamber or cylinder 16. The under part of the linter casing 14 is cut away to fit over the linting cylinder 6, as shown in Fig. 3, the bottom of said casing having an opening 17 within which a part of the linting cylinder enters. Within the casing is a grate 18 having ribs extending between the individual saws, and extending upward from the grate, at points between the saws, are projections 19 which support a common division board or partition 20, which division board separates the float chambers 15, 16. The division board is provided at its intermediate portion with an opening 21 to afford communication between the respective float chambers, for a purpose which will presently appear. The float chambers are arranged to different heights, as shown, and the upper chamber is equipped with an ordinary rotary float or beater 22, while a similar float 23 operates in the lower float chamber. At the ends of the upper float chamber, preferably at the upper portion thereof, are discharge openings 24 which may conveniently be cut in the end walls of the linter casing, as shown in Figs. 3 and 4. Leading downward from these discharge openings are discharge chutes or spouts 25 arranged at the respective ends of the machine and preferably applied to the end walls of the linter casing, as shown. The ends of the lower float 23 are provided with oppositely directed screws or conveyer flights 26, 26ª, as shown in Fig. 1, which flights feed the seed deposited in the end portions of the lower float chamber (by means of the spouts or hoppers 13) toward the center of said chamber where the opening 21 in the division board or partition is located. The lower float is likewise equipped at its ends with driving pulleys 27 and similar pulleys 28 are carried by the ends of the upper float 22, as shown in Figs. 1 and 2. These pulleys are applied to the respective float shafts, which are suitably journaled in the end walls of the linter casing, at the exterior of such casing, and they are driven by power belts 29, 30 at opposite ends of the machine (Figs. 2 and 3). These belts are driven by pulleys 31, 32 respectively, on an overhead shaft 33, and they pass around the driving pulleys of the floats in the manner shown in Fig. 2.

In order to tension the driving belts properly, tension pulleys 34 are employed, one in connection with each belt. As these pulleys are mounted and operated in substantially the same way, a description of one of them will suffice. Each tension pulley 34 is journaled in a forwardly extending lever 35 pivoted at 36 to the corresponding end frame 5. Said lever carries a yoke 36ª and the respective ends of the stud shaft 37 are journaled in the lever 35 and the yoke 36ª. It is obvious, therefore, that when the driving belt passes around the several pulleys in the manner shown in Fig. 2, an upward movement of the lever 35 on its pivot 36 will raise the tension pulley and cause a tightening of the belt, whereas a lowering of said lever will depress the tension pulley 34 and thereby relieve the tension on the belt. The lever may be held in the desired adjusted position by means of an upright bar or rod 38 rising from a bracket 39 applied to the adjacent end frame. The upper part of this bar or rod is provided with rack teeth 40 with which a pin 41 carried by the extremity of the lever 35 may be engaged to hold the lever at the desired elevation, as will be manifest.

In some instances I find it expedient to drive the feed roll 10 from one of the tension pulleys. In this case, the stud shaft 37 of one of the tension pulleys may be provided with a sprocket 42, as shown at the left of Fig. 1, and over this sprocket runs a chain 43 which drives the feed roll 11 by means of a larger sprocket 44 mounted on the extended end of said shaft. The sprocket 44 is loose on the shaft 11 and it has a grooved roller 45 made solid therewith and also freely rotatable on the shaft 11. A similar grooved roller 46 is permanently fixed to the shaft alongside the roller 45, and both of these rollers are adapted to be engaged by the end disks or flanges 47, 48 respectively of a sleeve 49 freely rotatable on a stud shaft 50 carried by a lever 51 pivoted at 52 to the end wall of the feed hopper 8 or to any suitable fixed part of the machine. The lever 51 can be raised and lowered manually in order to engage and disengage the disks 47, 48 and the grooved rollers 45, 46, respectively, and it is obvious that when the lever is lowered and there is no engagement between the rollers and disks, the rotation of the sprocket 44 by the rotating tension pulley and the connections previously described will have no effect on the feed roll shaft 11, on which said sprocket is freely rotatable under these conditions. If, however, the lever 51 is raised in order to engage the disks 47, 48 with the grooved rollers 45, 46, the rotation imparted to the sprocket 44 will, through the engagement of the roller 45 and disk 47, rotate the sleeve 49, with the result that the disk 48 is rotated in contact with the fixed roller 46 on the feed roll shaft, so that the latter is rotated, and with it the feed roll 11.

The discharge openings 24 of the upper float chamber are closed by gates which preferably comprise blocks or panels 53 carried by pivoted levers 54. The levers 54 of both gates are mounted on a common shaft 55 mounted for rocking movement in suitable bearings 56 carried by the framework of the machine, as shown in Fig. 4. By fixing both levers to the shaft, a movement of one gate with respect to its discharge opening 24 will effect a similar movement of the other gate at the same time, whereby both discharge openings are controlled simultaneously and in the same manner. When the gates are opened and the levers 54 are raised, the lever at the left of the machine (Fig. 1) may be caught under the stud shaft lever 51 in order to hold said last-named lever in such a position that the sleeve will engage the rollers 45, 46 on the feed roll shaft.

The operation of the machine is substantially as follows: The cotton seed to be linted is fed into the feed hopper 8 by means of the supply chute 9, and the rotation of the feed roll 10 will feed the seed from said hopper into the two end chutes 12, whence it falls into the spouts or hoppers 13 that discharge into the ends of the lower float chamber 16. The floats 22, 23 are rotated by the power belts 29, 30, as previously indicated, the tension of said belts being properly regulated by adjusting the levers 35 into the required position. The feed roll is driven from one of the tension pulleys 34 by means of the chain and sprocket mechanism hereinbefore described, it being necessary, however, in order to produce the rotation of the feed roll shaft by the loose sprocket 44, to have the sleeve 51 with its disks or flanges held in engagement with the rollers 45, 46 by supporting the lever 51 on one of the pivoted gates. The seed introduced into the ends of the lower float chamber is conveyed toward the center of said chamber by means of the screw conveyers 26, 26ª. In passing toward the center of the float chamber, the body of seed is worked into a dense roll, which is rotated by the float 23 in contact with the teeth of the rotating saws. In this way, a considerable amount of the lint is taken off by the saws at this stage of the operation, and the lint is removed from the saw teeth in any suitable way. The seed which is passed from both ends of the lower float chamber to the intermediate part of the same is forced, by the action of the conveyers and the rotation of the saws, through the opening 21 in the division board or partition 20 and into the central or intermediate part of the upper float chamber. The pressure of the incoming seed is sufficient to form a dense roll in this upper float chamber also, which roll is rotated in contact with the saws at another point. The seed in this body or roll passes in opposite directions toward the respective ends of the upper float chamber at the same time that the aforesaid rotary motion is given to it by the upper float 22, and when said chamber is completely filled with seed the latter begins to overflow and pass out of the discharge openings 24 at the opposite ends of the chamber, as will be understood. The seed thus discharged has, therefore, traveled over the periphery of the linting cylinder at two different points, and it has had to travel a certain allotted distance over the saws, so that when it issues from the openings or outlets 24 all of the desirable lint has been removed from the same. The linted seed drops from the openings 24 into the spouts 25, and from the lower ends of these spouts it may be discharged onto a conveyer (not shown) or into suitable receptacles.

It is manifest that the faster the material is fed into the machine by the feed roll 10, the denser both rolls of seed will become, and since the top of the upper roll is free to swell or expand above the discharge openings 24, the material will discharge just as fast as it is introduced into the machine. This, of course, is an important advantage. By discharging at the top of the top roll and at the ends of the same, the discharge of the seed is made independent of the saw spacing, as previously explained, so that a large number of saws may be grouped on the linting cylinder without interfering with the discharge of the seed. The discharge at the ends also prevents the float cylinders from becoming empty at any time, for if the feed is stopped by accident or otherwise, the discharge from the openings 24 will likewise be arrested and the rolls in the machine will continue to rotate in contact with the saws, whereby the effective work of the machine is continued. As soon as the discharge of the seed is stopped, by closing the gates 53, 54, the feed is stopped automatically. Both of the gates are moved simultaneously, as explained, and as soon as the gate at the left of the machine (Fig. 1) is lowered the lever 51 carrying the flanged sleeve 49 is allowed to drop in a downward direction, thereby moving the sleeve out of coöperation of the grooved rollers on the feed shaft. This, of course, causes the sprocket 44 to be rotated loosely on the feed shaft, which is no longer driven and which comes to a stop and discontinues the feed. Hence it will be noted that the members 45, 46 and 51 form parts of a clutch which is clutched in when the closures of the discharge outlets are open and disengaged when they are closed.

Perhaps one of the most important features of the invention is the fact that the seed passes from the lower to the upper roll *i. e.*, in a direction opposed to the force of gravity. As a consequence, the seed will only pass out of the lower float chamber into the upper one after it has accumulated therein to such an extent as to reach the comparatively high level of the opening 21, in the division board. Accordingly no discharge from the lower float chamber will take the place until a dense compact roll has been formed such as is necessary to effect a thorough linting action. This is also true of the upper float chamber, from which the seed cannot be discharged until it reaches the level of the discharge openings 24, which are at the top of the roll. It will be understood that if the feed is slow the seed cannot pass through the machine without being effectively linted, and this is a result of the highest importance wherein my linter is distinguished from the ordinary linters now on the market. The seed must accumulate in the float chambers until the latter are filled, before any discharge can possibly take place, and during the time that the seed is being worked up into compact dense rolls of the required character, the saws are obviously doing effective work on the seed. Hence the invention provides a machine which does especially effective linting or delinting and wherein the feeding in of seed and the discharging thereof keep pace with each other automatically within certain limits. In the ordinary linter special care must be exercised to feed in seed in correspondence with the discharge, and this is a difficult matter, but in the present machine the feeding in of seed does not necessitate such constant care and supervision on the part of the operator.

It is obvious that numerous features of my invention are capable of independent use, and that I have not attempted to describe all of the various modifications of the construction that might be adopted without digressing from my inventive idea.

What I claim is:—

1. In a cotton seed linter, a linting cylinder, upper and lower seed chambers associated therewith at different points in the periphery thereof and in communication with each other, and means to feed the seed through said chambers in a direction opposed to the force of gravity.

2. In a cotton seed linter, a linting cylinder, a float chamber associated therewith, and into the opposite ends of which the seed is fed, and a second float chamber in connection with the linting cylinder and in communication with said first-named chamber, the seed being discharged from the ends of said second chamber.

3. In a cotton seed linter, a linting cylinder, seed chambers associated therewith at different points in the periphery of said cylinder and in communication with each other intermediate of their ends, means to feed the seed into one of said seed chambers, and means to discharge the seed from both ends of the other seed chamber.

4. In a cotton seed linter, a linting cylinder, upper and lower seed chambers associated with said cylinder and in communication with each other, and means to feed the seed into the lower seed chamber, such seed being discharged from the top of the upper seed chamber, as described.

5. In a cotton seed linter, a linting cylinder, means to rotate separate rolls of seed in contact with said cylinder at different points in the periphery thereof, and a division board having means to conduct the seed from the intermediate portion of one roll to the intermediate portion of the other roll.

6. In a cotton seed linter, a linting cylinder, means to rotate separate rolls of seed in contact with said cylinder at different points in its periphery, means to feed seed to the ends of one roll, means to conduct the seed from the intermediate part of one roll to the intermediate part of the other, and means to discharge the seed at both ends of the second roll.

7. In a cotton seed linter, a linting cylinder, means for rotating upper and lower rolls of seed in contact with said cylinder, means to feed in seed at the ends of the lower roll, means to permit seed to pass from the lower to the upper roll, and means to discharge said seed at the ends of the upper roll.

8. The combination of a linting cylinder, upper and lower float chambers in communication with each other, rotary floats in said chambers, means to feed seed into the ends of the lower chamber, and means to discharge seed from the ends of the upper chamber.

9. The combination of a delinting cylinder, a linter casing partially inclosing said cylinder, a division board in said casing dividing the same into two float chambers and having an opening intermediate of its length to establish communication between said chambers, and rotary floats in the respective chambers.

10. In a cotton seed linter, a linting cylinder, upper and lower float chambers in connection therewith and in communication with each other intermediate of their ends, floats operating in said chambers, means to feed seed into the ends of the lower float chamber, and means to discharge seed from the ends of the upper float chamber.

11. In a cotton seed linter, a linting cylinder, means to rotate separate rolls of seed in contact with said cylinder at different points in the periphery thereof, means to conduct the seed from the intermediate portion of one roll to the intermediate portion of the other roll, and means to supply the seed to and discharge it from the ends of the respective rolls.

12. In a cotton seed linter, a linting cylinder, means to rotate an upper and a lower roll of seed in contact with said cylinder at different points in the periphery thereof, means to conduct the seed from the lower roll to the upper roll, means to feed seed to the lower roll, and means to discharge the seed from the top of the upper roll.

13. In a cotton seed linter, a linting cylinder, means to rotate an upper and a lower roll of seed in contact with said cylinder at different points in the periphery thereof, means to feed seed to the lower roll, means to conduct seed from the intermediate portion of the lower roll to the intermediate portion of the upper roll, and means to discharge the seed from the upper end portions of the upper roll.

14. In a cotton seed linter, a linting cylinder, means to rotate upper and lower rolls of seed in contact therewith, means to feed seed to the respective ends of the lower roll, and means to afford communication between the intermediate portions of the respective rolls, the linted seed being discharged from the top of the upper roll, as described.

15. In a cotton seed linter, a linting cylinder, upper and lower float chambers in connection therewith and in communication with each other intermediate of their ends, floats operating in said chambers, means to supply seed to the lower float chamber, and means to permit a discharge of seed from the top of the roll in the upper float chamber.

16. In a cotton seed linter, a casing, a linting cylinder journaled therein, upper and lower float chambers associated with said cylinder and having communication with each other, floats operating in said chambers, a feed hopper above the machine, means to supply seed from said hopper into the ends of the lower float chamber, and means to discharge the seed from the upper portion of the upper float chamber.

17. In a cotton seed linter, a casing, a linting cylinder journaled therein, upper and lower float chambers associated with said cylinder and in communication with each other intermediate of their ends, floats operating in said chambers, a feed hopper at the top of the machine, spouts for discharging seed from the hopper into the ends of the lower float chamber, and discharge chutes leading from the ends of the upper float chamber.

18. In a cotton seed linter, a linting cylinder, float chambers associated therewith and in communication intermediate of their ends, floats in the respective chambers, means to supply seed into the end portions of one of said chambers, and conveyer flights associated with the end portions of the float in that chamber, and acting to move the seed toward the center of the chamber.

19. The combination with a float chamber having discharge openings, of closures in connection with the respective openings, and means connecting said closures to cause a simultaneous movement thereof.

20. The combination, in a cotton seed linter, of a rotary feed roll to feed seed into the machine, a discharge preventing closure, and means to arrest the rotation of the feed roll when the discharge of seed is cut off by said closure.

21. In a cotton seed linter, a rotary feed roll, a manually operable gate to cut off the discharge of seed, and a feed roll clutch controlled by said gate.

22. In a cotton seed linter, a feed roll shaft, rotary float shafts having pulleys, a power belt to drive said pulleys, a tension pulley for the belt, and a direct driving connection between said tension pulley and the feed roll shaft, to rotate the latter.

In testimony whereof I affix my signature, in presence of two witnesses.

CHARLES HIRAM FULSON.

Witnesses:
J. MURPHEY,
P. D. SMITH, Jr.

---

Copies of this patent may be obtained for five cents each, by addressing the "Commissioner of Patents, Washington, D. C."